(12) United States Patent
Jones et al.

(10) Patent No.: US 6,966,644 B2
(45) Date of Patent: Nov. 22, 2005

(54) GUIDE FOR SOLID INK STICK FEED

(75) Inventors: Brent R. Jones, Tualatin, OR (US); Frederick T. Mattern, Portland, OR (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 10/816,237

(22) Filed: Apr. 1, 2004

(65) Prior Publication Data

US 2004/0183875 A1 Sep. 23, 2004

Related U.S. Application Data

(62) Division of application No. 10/135,078, filed on Apr. 29, 2002, now Pat. No. 6,739,713.

(51) Int. Cl.[7] .............................................. B41J 2/175
(52) U.S. Cl. .......................................... 347/88; 347/99
(58) Field of Search .............................. 347/88, 99, 85, 347/84, 95

(56) References Cited

U.S. PATENT DOCUMENTS

| | | | |
|---|---|---|---|
| 4,561,789 A | 12/1985 | Saito | 101/114 |
| 5,223,860 A | 6/1993 | Loofbourow et al. | 347/88 |
| 5,270,730 A | 12/1993 | Yaegashi et al. | 106/31.29 |
| 5,455,604 A | 10/1995 | Adams et al. | 346/138 |
| D371,802 S | 7/1996 | Jones et al. | D18/56 |
| 5,734,402 A | 3/1998 | Rousseau et al. | 347/88 |
| 5,805,191 A | 9/1998 | Jones et al. | 347/103 |
| 5,861,903 A | 1/1999 | Crawford et al. | 347/88 |
| 5,975,690 A | 11/1999 | Grellmann et al. | 347/88 |
| 6,010,214 A | 1/2000 | Sago et al. | 347/88 |
| 6,053,608 A | 4/2000 | Ishii et al. | 347/88 |
| 6,254,228 B1 | 7/2001 | Sago | 347/88 |
| 2003/0202064 A1 | 10/2003 | Jones et al. | 347/88 |
| 2003/0202067 A1 | 10/2003 | Jones et al. | 347/88 |
| 2003/0202069 A1 | 10/2003 | Jones | 347/88 |
| 2003/0202071 A1 | 10/2003 | Jones et al. | 347/88 |

OTHER PUBLICATIONS

English Abstract for Japanese Patent Publication JP 04093259.

*Primary Examiner*—Manish Shah
*Assistant Examiner*—Leonard Liang
(74) *Attorney, Agent, or Firm*—David J. Arthur

(57) ABSTRACT

An ink stick for use in a solid ink feed system of a phase change ink printer includes a three dimensional ink stick body that has formed in it guide means. The guide means is formed in a first portion of the ink stick body, for guiding the ink stick along a defined path in the ink stick feed system. An ink stick feed system includes a longitudinal guide rail in a first portion of a feed channel. The width of the longitudinal guide rail is substantially less than the width of the feed channel. The guide means in the ink stick is a longitudinal guide element having a shape that is substantially complementary of the shape of the longitudinal guide rail of the feed channel.

20 Claims, 15 Drawing Sheets

GUIDE FOR SOLID INK STICK FEED

This application is a divisional application of U.S. application Ser. No. 10/135,078, now U.S. Pat. No. 6,739,713 filed Apr. 29, 2002 by Brent R. Jones et al., and entitled "Guide for Solid Ink Stick Feed," the contents of which are hereby incorporated herein by reference.

CROSS-REFERENCE TO RELATED APPLICATIONS

Reference is made to commonly-assigned copending U.S. patent application Ser. No. 10/135,051, now U.S. Publication No. 20030202067A1, filed Apr. 29, 2002, entitled "Guide For Solid Ink Stick Feed," by Jones et al., U.S. patent application Ser. No. 10/135,077, now U.S. Publication No. 20030202069A1, filed Apr. 29, 2002, entitled "Guide For Solid Ink Stick Feed," by Jones, U.S. patent application Ser. No. 10/135,156, now U.S. Publication No. 20030202071A1 filed Apr. 29, 2002, entitled "Feed Guidance and Identification for Ink Stick," by Jones et al., and U.S. patent application Ser. No. 10/135,038, now U.S. Publication No. 20030202064A1, filed Apr. 29, 2002, entitled "Channel Keying for Solid Ink Stick Feed," by Jones et al., the disclosures of which are incorporated herein."

The present invention relates generally to ink printers, the ink used in such ink printers, and the apparatus and method for feeding the ink into the printer.

BACKGROUND

Solid ink or phase change ink printers conventionally receive ink in a solid form, either as pellets or as ink sticks. A feed mechanism delivers the solid ink to a heater assembly, where the ink is melted into a liquid state for jetting onto a receiving medium.

Solid ink or phase change ink printers conventionally receive ink in a solid form and convert the ink to a liquid form for jetting onto a receiving medium. The printer receives the solid ink either as pellets or as ink sticks in a feed chute. With solid ink sticks, the solid ink sticks are either gravity fed or spring loaded through the feed chute toward a heater plate. The heater plate melts the solid ink into its liquid form. In a printer that receives solid ink sticks, the sticks are gravity fed or spring loaded along a feed channel and pressed against a heater plate to melt the solid ink into its liquid form. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

SUMMARY

An ink stick for use in a solid ink feed system of a phase change ink printer includes a three dimensional ink stick body that has formed in it guide means. The guide means is formed in a first portion of the ink stick body, for guiding the ink stick along a defined path in the ink stick feed system. An ink stick feed system includes a longitudinal guide rail in a first portion of a feed channel. The width of the longitudinal guide rail is substantially less than the width of the feed channel. The guide means in the ink stick is a longitudinal guide element having a shape that is substantially complementary of the shape of the longitudinal guide rail of the feed channel.

A method of loading an ink stick into a solid ink feed system of a phase change ink jet printer includes aligning a guide element in the lower portion of the ink stick with a longitudinal guide rail in the feed system. The ink stick is then inserted into the feed system. The guide element is rested on the longitudinal guide rail so that contact between the ink stick guide element and the feed channel guide rail is the primary contact between the ink stick and the feed system.

THE DRAWINGS

DETAILED DESCRIPTION

Figure 1:
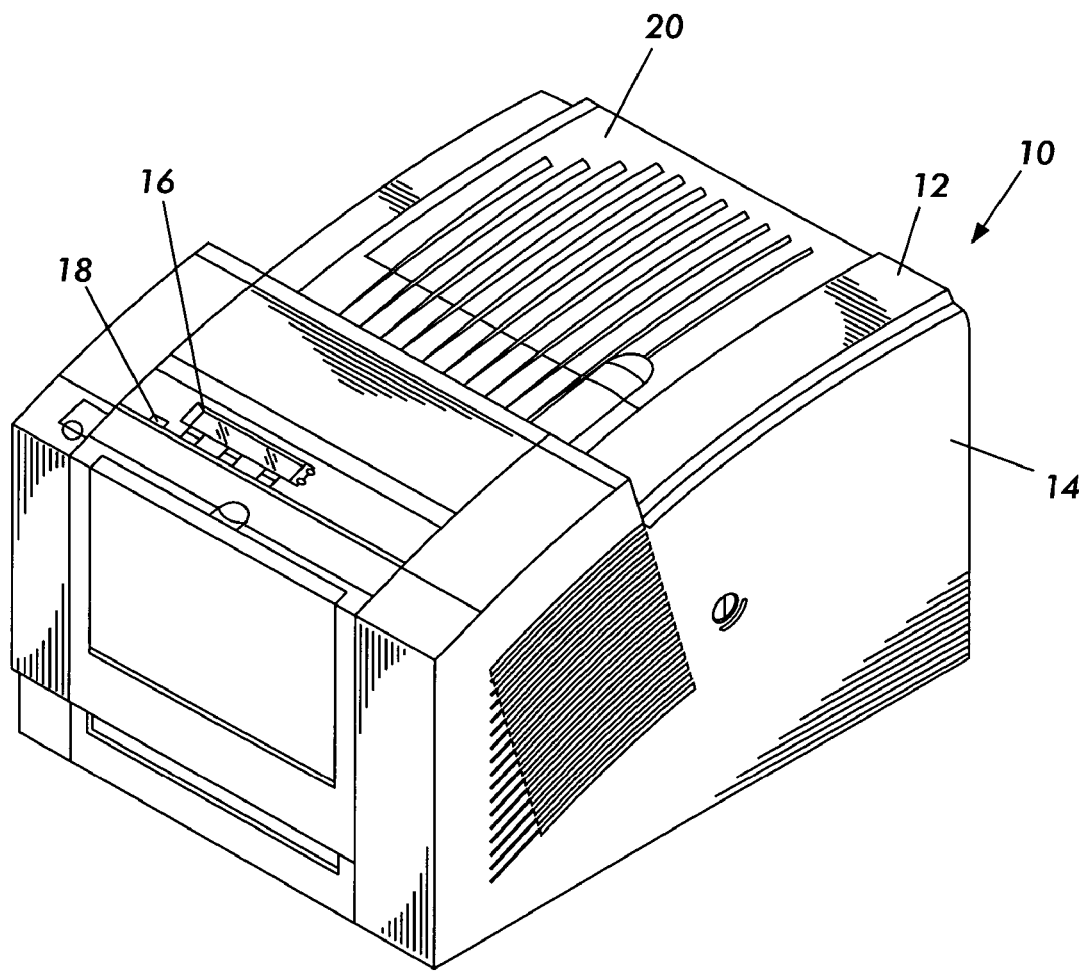
FIG. 1 is a perspective view of a phase change printer with the printer top cover closed.
Figure 2:
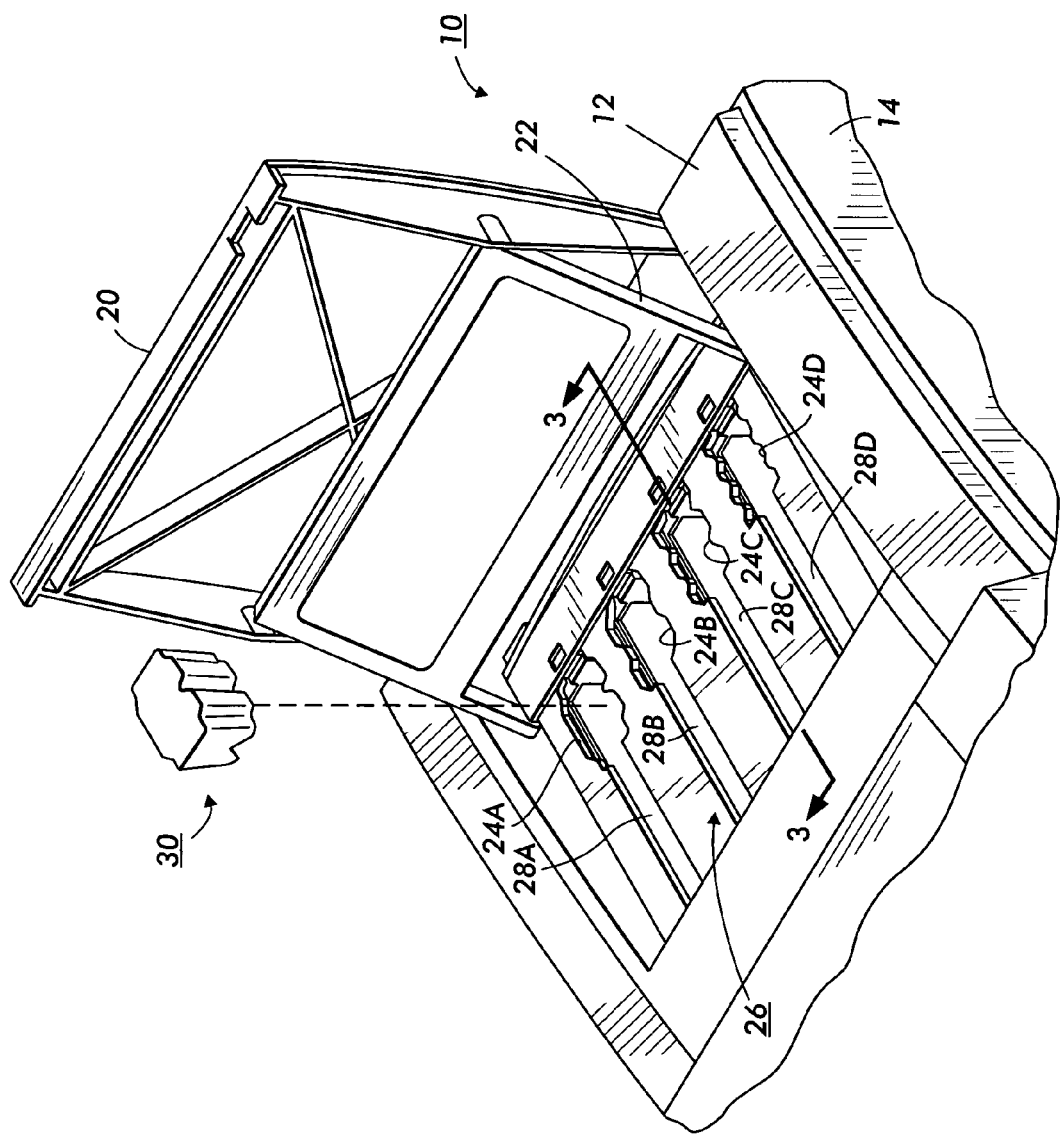
FIG. 2 is an enlarged partial top perspective view of the phase change printer with the ink access cover open, showing a solid ink stick in position to be loaded into a feed channel.

FIG. 1 shows a solid ink, or phase change, ink printer 10 that includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. An ink jet printing mechanism (not shown) is contained inside the housing. Such a printing mechanism is described in U.S. Pat. No. 5,805,191, entitled Surface Application System, to Jones et al, and U.S. Pat. No. 5,455,604, entitled Ink Jet Printer Architecture and Method, to Adams et al. An ink feed system delivers ink to the printing mechanism. The ink feed system is contained under the top surface of the printer housing. The top surface of the housing includes a hinged ink access cover 20 that opens as shown in FIG. 2, to provide the user access to the ink feed system.

In the particular printer shown, the ink access cover 20 is attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al., though with some differences noted below. As seen in FIG. 2, opening the ink access cover reveals a key plate 26 having keyed openings 24A, 24B, 24C, 24D. Each keyed opening 24A, 24B, 24C, 24D provides access to an insertion end of one of several individual feed channels 28A, 28B, 28C, 28D of the solid ink feed system (see FIGS. 2 and 3).

Each longitudinal feed channel 28 delivers ink sticks 30 of one particular color to a corresponding melt plate 32. Each feed channel has a longitudinal feed direction from the insertion end of the feed channel to the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown). The feed channels 28 have a longitudinal dimension from the insertion end to the melt end, and a lateral dimension, substantially perpendicular to the longitudinal dimension. Each feed channel in the particular embodiment illustrated includes a push block 34 driven by a driving force or element, such as a constant force spring 36, to push the individual ink sticks along the length of the longitudinal feed channel toward the melt plates 32 that are at the melt end of each feed channel. The tension of the constant force spring 36 drives the push block toward the melt end of the feed channel. As described in U.S. Pat. No. 5,861,903, the ink load linkage 22 is coupled to a yoke 38, which is attached to the constant force spring 36 mounted in the push block 34. The attachment to the ink load linkage 22 pulls the push block 34 toward the insertion end of the feed channel when the ink access cover is raised to reveal the key plate 26.

A color printer typically uses four colors of ink (yellow, cyan, magenta, and black). Ink sticks 30 of each color are delivered through a corresponding individual one of the feed channels 28. The operator of the printer exercises cares to avoid inserting ink sticks of one color into a feed channel for a different color. Ink sticks may be so saturated with color dye that it may be difficult for a printer user to tell by color alone which color is which. Cyan, magenta, and black ink sticks in particular can be difficult to distinguish visually based on color appearance. The key plate 26 has keyed openings 24 to aid the printer user in ensuring that only ink sticks of the proper color are inserted into each feed channel. Each keyed opening 24A, 24B, 24C, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

Figure 4:
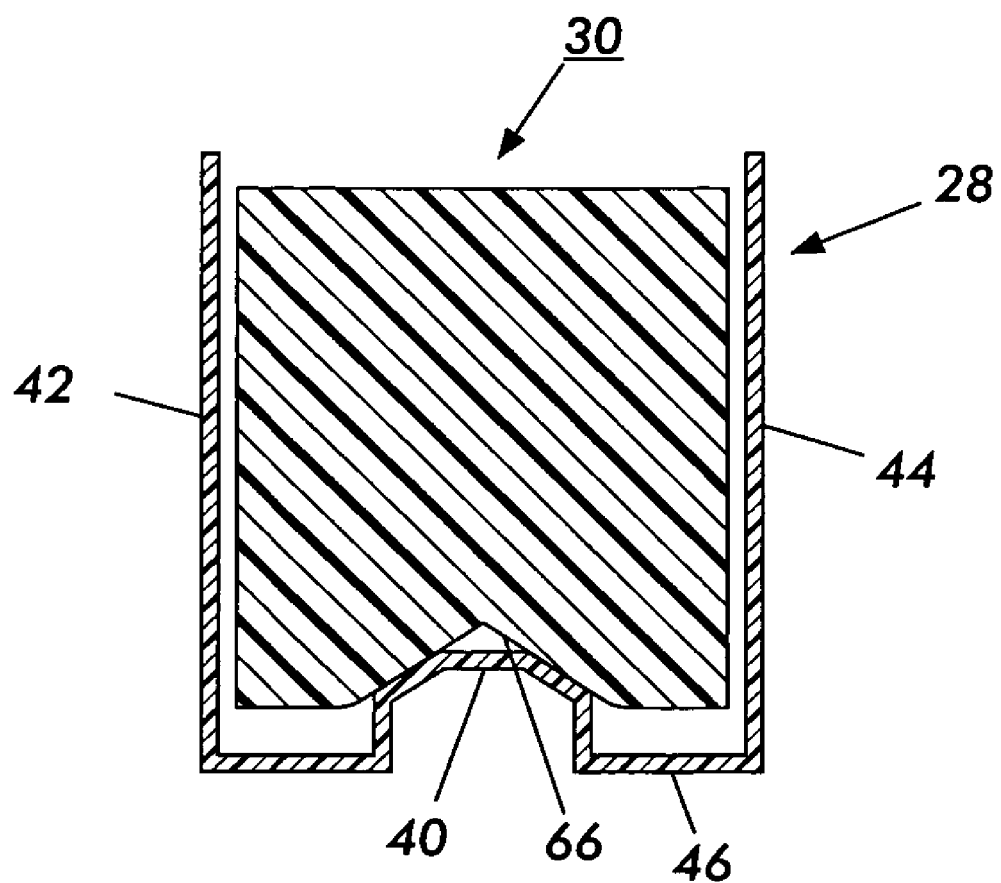
FIG. 4 is a simplified cross-sectional view of a feed channel taken along line 4—4 of FIG. 3.

Referring next to FIG. 4, the feed channel 28 is defined by lateral side walls 42, 44 that are substantially vertical, and a bottom 46. The transverse dimension is between the lateral side walls 42, 44. A longitudinal feed channel guide rail 40 is included in a lower portion of the feed channel, preferably near the bottom of the feed channel. This feed channel guide rail 40 is substantially centered in the lateral dimension in the feed channel, as shown in FIG. 4, so that it is aligned with the central longitudinal axis of the feed channel. The guide rail 40 is designed to receive the bottom surface of an ink stick. The exemplary feed channel guide rail illustrated is approximately the shape of an inverted "V" with a truncated peak, so that the width of the feed channel guide rail 40 at its peak is substantially less than the width of the feed channel between the side walls 42, 44.

Figure 5:
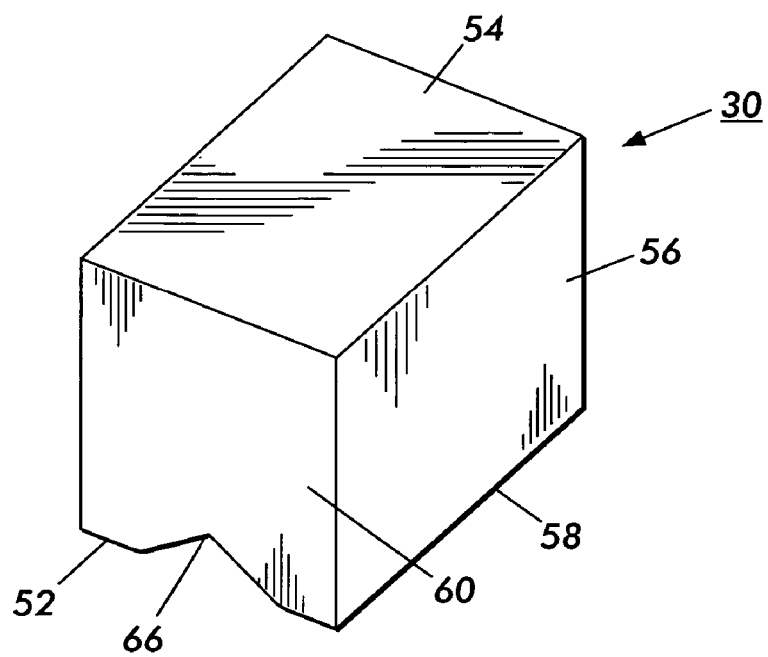
FIG. 5 is a perspective view of one embodiment of a solid ink stick.
Figure 6:
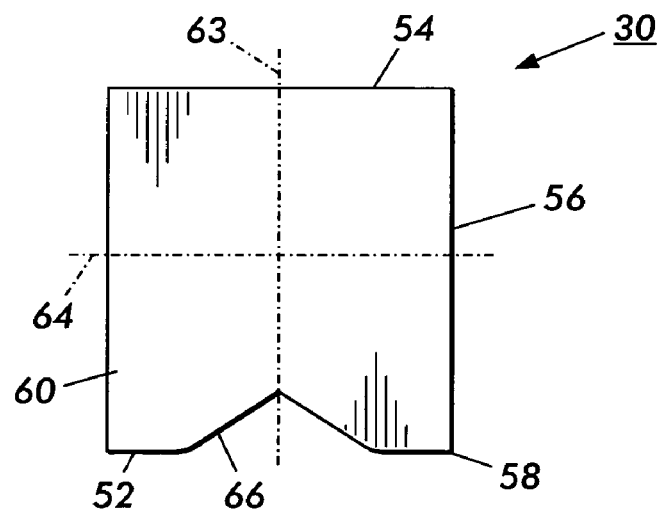
FIG. 6 is an end elevational view of the ink stick of FIG. 5.

An exemplary solid ink stick 30 for use in the feed channel with the feed channel guide rail is illustrated in FIGS. 5 and 6. The ink stick is formed of an ink stick body having a bottom, represented by a general bottom surface 52, a top, represented by a general top surface 54, and at least two lateral extremities or sides, represented by general side surfaces 56. The ink stick is illustrated without the key shapes on the lateral sides that correspond to the key plate openings 24A, 24B, 24C, 24D through the key plate 26, to simplify the illustration. The surfaces of the ink stick body need not be flat, nor need they be parallel or perpendicular to one another. However, these descriptions will aid the reader in visualizing, even though the surfaces may have three dimensional topography, or be angled with respect to one another. The bottom of the ink stick body is a bottom surface having lateral edges 58 at which the bottom surface 52 intersects the lateral side surfaces 56. The ink stick body may be formed in a substantially rectangular block in which the lateral side surfaces 56 are substantially parallel one another. Such a rectangular block form of the ink stick body also includes two end surfaces 60 that are substantially parallel to one another, and are substantially perpendicular to the side surfaces 56. Nevertheless, other shapes of the side and end surfaces are also possible, including curved surfaces. As noted above, the side surfaces 56 may also be shaped with the key shapes to match the keyed openings 24A, 24B, 24C, 24D through the key plate 26. The lateral side surfaces can also be segmented or stepped, so that one portion of the ink stick body is narrower than another. The ink stick body may be formed by pour molding, compression molding, or other formation techniques.

The ink stick body has a lateral center of gravity 63 between the lateral side surfaces 56 of the ink stick body, and a vertical center of gravity 64 between the top and bottom surfaces 52, 54. If the ink stick body has a substantially uniform weight density, the lateral center of gravity 63 is approximately midway between the lateral side surfaces 56 of the ink stick body. The lateral center of gravity 63 is identified in the ink stick body without the key shape elements that may be formed in the lateral side surfaces of the ink stick body.

Guide means including a longitudinal ink stick guide element 66 is formed in the lower portion of the ink stick body for guiding the ink stick 30 along the feed channel guide rail 40 in the feed channel 28. The longitudinal guide element 66 is formed in the bottom surface 52 of the ink stick body, and extends along the entire length of the body between the end surfaces 60. The longitudinal guide element 66 is substantially aligned with the lateral center of gravity 63 of the ink stick body. In the ink stick embodiment illustrated in FIGS. 5 and 6, the bottom surface 52 of the ink stick body is formed in the shape of an inverted "V", with the peak approximately vertically aligned with the lateral center of gravity of the body to form the ink stick guide element 66. If the ink stick body has a substantially uniform weight density, the peak of the inverted V forming the guide element is substantially midway between the lateral edges 58 of the bottom surface of the ink stick body. Of course, inherent in many forming techniques is that the corners and edges may have radii, and not be square. In addition, in certain circumstances, radius edges will be desired.

Referring again to FIG. 4, the slope of the "V" shape of the ink stick guide element 66 in the bottom surface of the ink stick body is substantially the same as the slope of the feed channel guide rail 40 in the ink feed channel. This common slope between the guide element surface 66 and the feed channel guide rail 40 allows a portion of the ink stick guide element to contact the feed channel guide rail to allow the feed channel guide rail to guide the ink stick along the feed channel, and help to hold the ink stick upright in the feed channel. The primary support contact between the bottom surface of the ink stick body and the longitudinal feed channel is the contact between the central guide element in the bottom surface of the ink stick body and the feed channel guide rail. The lateral side portions of the bottom surface of the ink stick body, adjacent the lateral edges 58 of the bottom surface 52 do not generally contact the bottom 46 of the feed channel 28. Such minimal contact between the bottom surface of the ink stick body and the feed channel guide rail minimizes the opportunity for chips or flakes of the ink material to interfere with the progress of the ink stick along the feed channel.

The lateral dimension of the ink stick body between the side surfaces 56 is no wider than the lateral dimension of the ink stick feed channel 28 between the side walls 42, 44. The lateral dimension of the ink stick body between the side surfaces 56 is substantially the same as the lateral dimension of the ink stick feed channel 28 between the side walls 42, 44, or more specifically only fractionally smaller than the lateral dimension of the ink stick feed channel 28 between the side walls 42, 44. For example, the ink stick body may have a longitudinal dimension (not including protruding insertion key or orientation elements) between the end surfaces 60 of between approximately 1.1 and 1.8 inches (28–46 mm), such as 1.5 inches (37 mm). The ink stick body may have a lateral dimension (not including protruding insertion key or orientation elements) between the lateral side surfaces 56 of between approximately 1.0 and 1.3 inches (25–33 mm), such as 1.3 inches (33 mm). The ink stick body may have a vertical dimension between the bottom and top surfaces 52, 54 of between approximately 1.0 and 1.5 inches (25–38 mm), such as 1.25 inches (32 mm). The lateral dimension of the ink stick feed channel 28 between the side walls 42, 44 may be approximately 0.004 to 0.08 inches (0.1–2 mm) wider than the lateral dimension of the ink stick body. Thus, the ink stick body 30 remains substantially upright and balanced with the central longitudinal guide element of the ink stick body resting on the feed channel guide rail of the feed channel. To the extent that the ink stick body tilts to one side or the other, one of the upper lateral edges of the ink stick body formed by the intersection of the lateral side surfaces 56 with the top surface 54 may contact a side wall 42, 44 of the feed channel. Thus, substantially the only contact between the bottom surface of the ink stick body and the feed channel is the contact between the longitudinal guide element 66 formed in the bottom surface of the ink stick body, and the guide rail 40 in the feed channel. Minor contact between an upper portion of the lateral side surface 56 of the ink stick body and the side of the feed channel 42, 44 may also occur.

The ink stick guide element 66 in the bottom surface of the ink stick body and the feed channel guide rail 40 in the feed channel cooperate to maintain the orientation of the ink stick as the ink stick progresses along the length of the feed channel from the insertion end to the melt end. The ink stick guide element 66 and the feed channel guide rail 40 forming the guide means keep the ink stick aligned with the feed channel. The ink stick body does not become skewed with respect to the feed channel. With the ink stick properly aligned with the feed channel, the ink stick meets the melt plate 32 normal to the melt plate surface. Proper alignment between the ink stick and the melt plate enhances even melting of the ink stick. Even melting reduces the formation of unmelted corner slivers at the trailing end of each ink stick. Such unmelted corner slivers may slip through the gap 33 between the melt plate and the end of the feed channel. Such slivers may interfere with the proper functioning of certain portions of the printer. Guiding the ink stick to maintain its alignment in the feed channel also eliminates jamming due to skewing of the ink stick as it moves along the channel.

Key element shapes in the lateral side surfaces 56 of the ink stick body may tend to affect the orientation of the ink stick body as the ink stick moves along the feed channel. The interaction of the guide element 66 and the guide rail 40 counteracts that tendency, and maintains the correct orientation of the ink stick in the feed channel. The cooperative action of the ink stick guide element 66 and the feed channel guide rail 40 also reduce the "steering" effect the push block 34 acting on the trailing end surface of the ink stick in the feed channel 28. Thus, laterally offset pressure by the push block 34 on the ink stick body is of lesser concern, and maintaining a perfect lateral balance of the force exerted by the push block on the ink stick is less critical than with certain other designs.

As seen in FIGS. 5 and 6, the inverted "V" shape of the ink stick guide element 66 need not necessarily extend all of the way to the lateral edges 58 of the bottom surface of the ink stick body. The outer lateral portions of the bottom surface may be substantially flat, parallel to the top surface 54 of the ink stick body. Various alternative shapes for the bottom surface of the ink stick body can be implemented.

Figure 7:
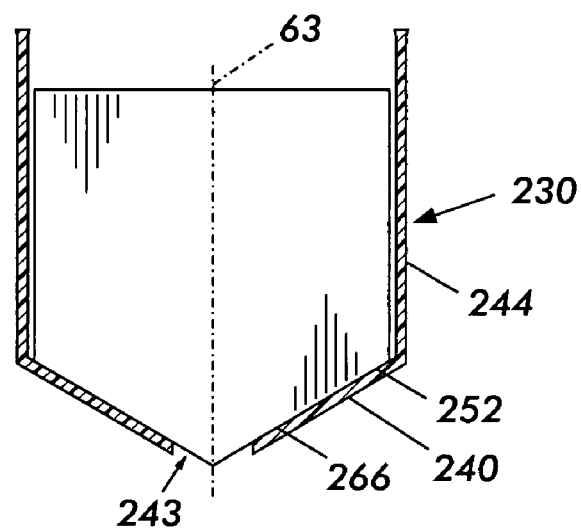
FIG. 7 is a simplified cross-sectional view of an alternate feed channel and ink stick.
Figure 8:
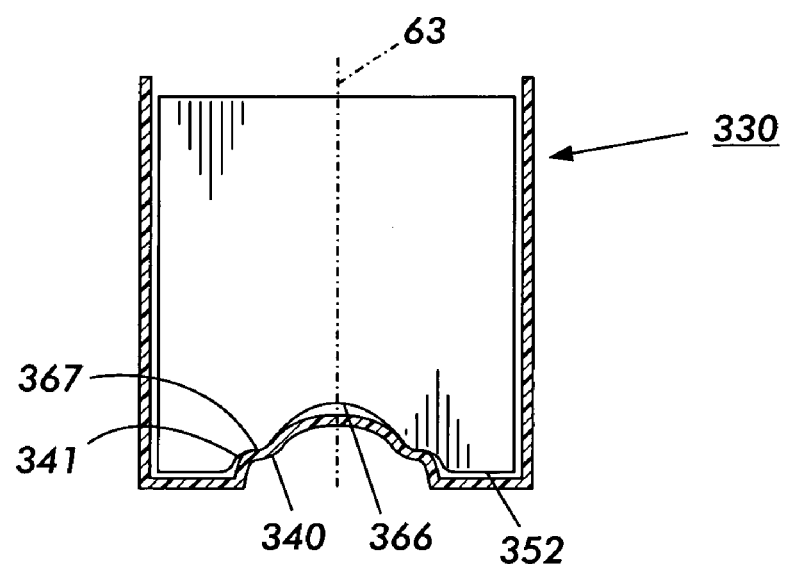
FIG. 8 is a simplified cross-sectional view of yet another alternate feed channel and ink stick.

Two additional exemplary embodiments are shown in FIGS. 7 and 8. The ink stick body embodiment shown in FIG. 7 has a bottom surface 252 with an ink stick guide element 266 formed as a non-inverted, or projecting, "V" shape. The bottom surface of the feed channel has a corresponding shape to form the feed channel guide rail 240. In the illustrated embodiment, the feed channel guide rail 240 is formed as two angled channel segments that extend from the side walls 242, 244 toward the center of the feed channel. The angle of the feed channel guide rail 240 substantially matches the angle of the guide element 266. The feed channel guide rail 240 does not extend across the entire width of the feed channel, providing an opening 243 in the bottom of the feed channel. The bottom opening 243 allows chips and slivers of ink material that break off from the ink stick to fall away, so that they do not interfere with movement of the ink stick along the feed channel.

The ink stick 330 shown in FIG. 8 includes a guide element 366 formed as a concave shape in the bottom 352 of the ink stick body. The concave ink stick guide element 366 cooperates with the feed channel guide rail 340. The feed channel guide rail 340 and the ink stick guide element 366 have alignment guides 341, 367 to avoid a tendency of the ink stick to rotate about the feed channel guide rail 340 and tilt in the feed channel. The alignment guides illustrated are a longitudinal ridge 341 along the feed channel guide rail 340, and a corresponding longitudinal notch 367 along the ink stick guide element 366. The guide element can also be formed of a convex shape in the bottom of the ink stick body. The guide element can also be formed of a convex shape in the bottom of the ink stick body.

In accordance with a method of using the ink stick and ink feed system shown, the printer user provides an ink stick such as the ink stick shown in FIGS. 4–6, or the alternative embodiments shown in FIGS. 7–8. The user opens the ink access cover 20, as seen in FIG. 2. The user inserts the ink stick 30 through the keyed opening 24A, 24B, 24C, 24D in the key plate 26 and into the corresponding feed channel 28. The user inserts the ink stick so that the ink stick guide element 66 formed in the bottom surface of the ink stick body is aligned with the feed channel guide rail 40 in the feed system. The user places the ink stick body in the insertion end of the feed channel so that the ink stick guide element 66 rests on the feed channel guide rail 40. In this way, substantially the only contact between the bottom surface of the ink stick and the feed system is the contact between the guide element in the ink stick body and the feed channel guide rail of the feed channel. The user then closes the feed system cover 22 and the printer cover 20. The push block 34 pushes the ink stick along the feed channel 28 toward the melt plate 32, with the ink stick guide element 66 sliding along the feed channel guide rail 40 of the feed channel.

Figure 9:
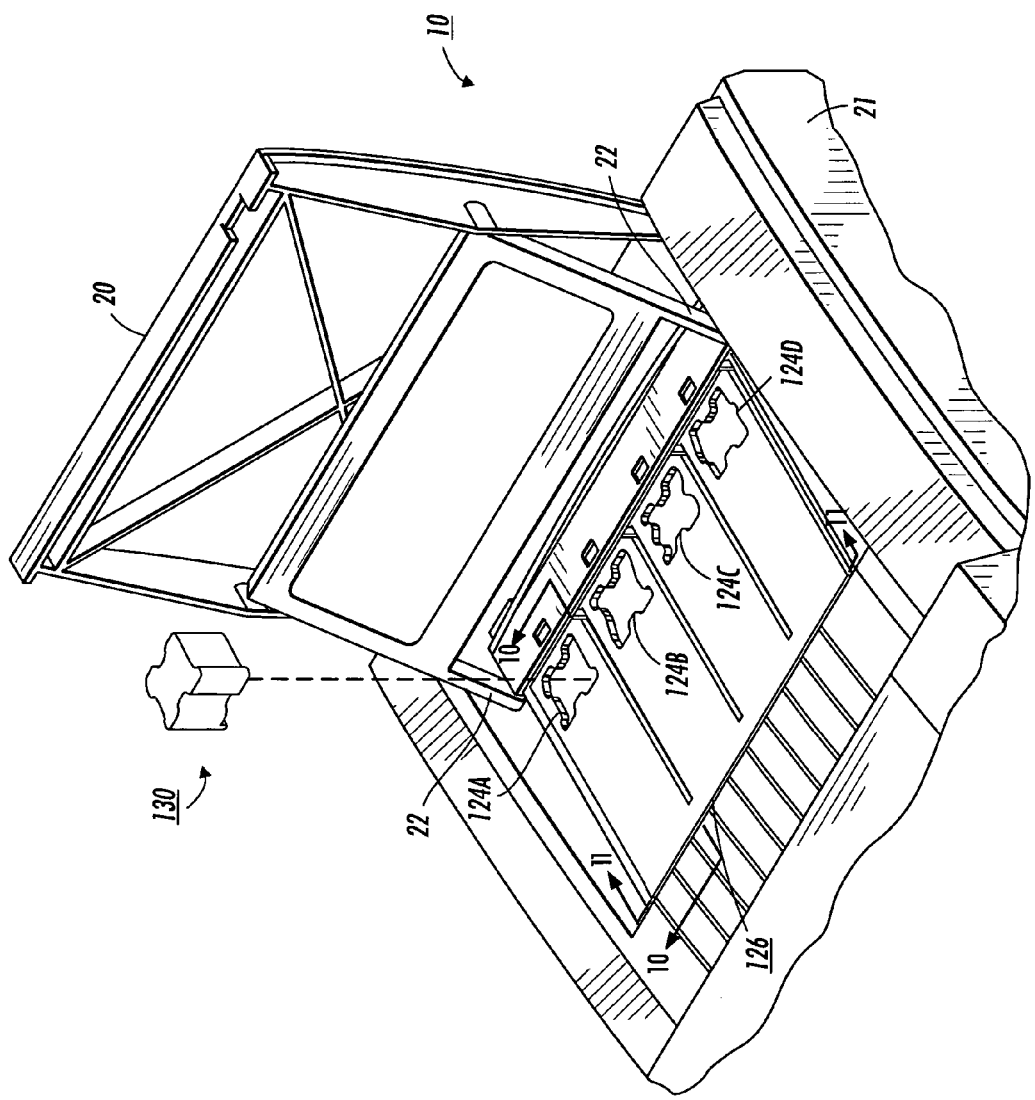
FIG. 9 is a perspective view of another embodiment of a phase change printer with the printer ink access cover open.
Figure 10:
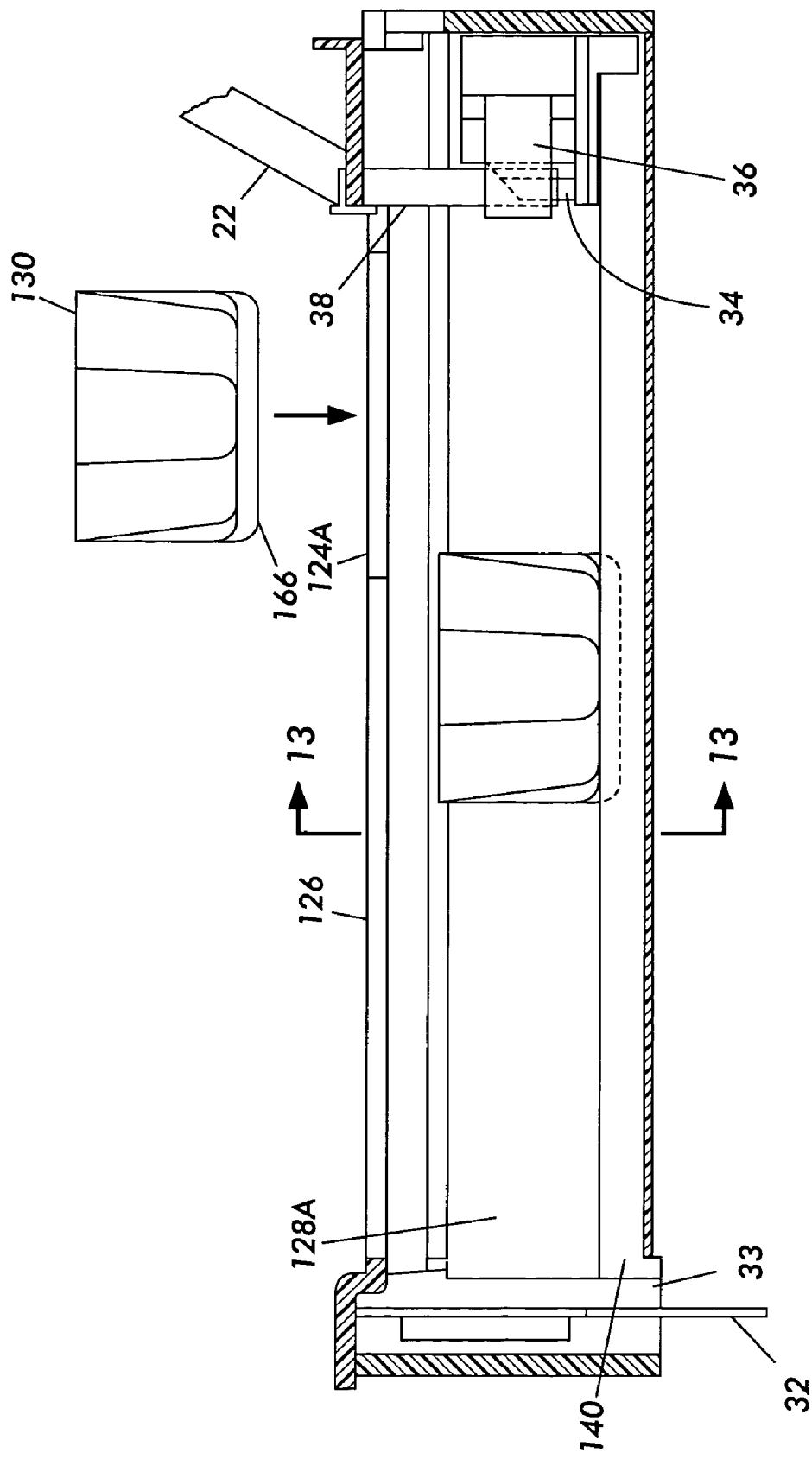
FIG. 10 is a side sectional view of one embodiment of a feed channel of a solid ink feed system, taken along line 10—10 of FIG. 9.
Figure 11:
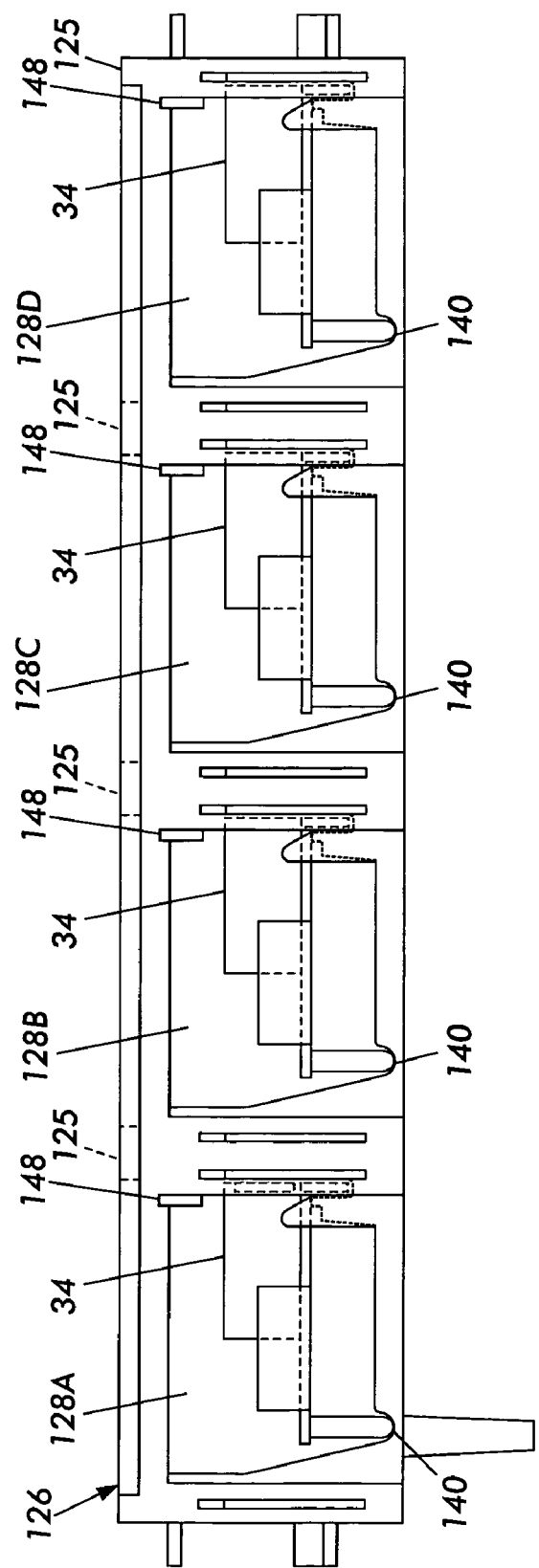
FIG. 11 is a sectional view of the ink stick feed system, taken along line 11—11 of FIG. 9.

FIGS. 9–11 illustrate another embodiment of a phase change ink jet printer with a different embodiment of a key plate 126. Each keyed opening 124A, 124B, 124C, 124D in the key plate 126 provides access to a corresponding feed channel 128A, 128B, 128C, 128D (see FIGS. 10 and 11).

Figure 12:
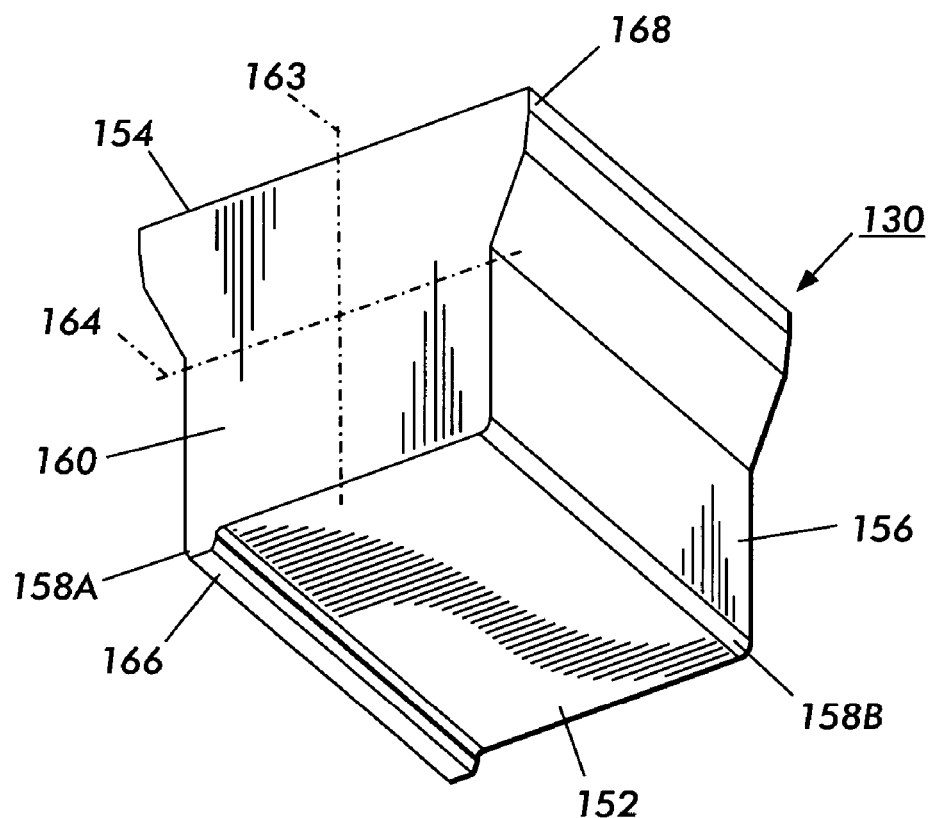
FIG. 12 is a perspective view of another embodiment of a solid ink stick.

An exemplary ink stick for use in the printer of FIGS. 9–11 is shown in perspective in FIG. 12. The ink stick illustrated is formed of a three dimensional substantially rectangular body of ink material that has a bottom, represented by a bottom surface 152, a top, represented by a top surface 154, and sides, represented by two lateral side surfaces 156 and two end surfaces 160. In the particular somewhat cubic shape illustrated, the intersections of the bottom surface 152 and the lateral side surfaces 156 of the ink stick body form lateral edges 158 of the bottom surface. The side surfaces 156 of the illustrated embodiment are stepped or tapered so that the upper portion of the ink stick body is slightly wider than the lower portion. The side surfaces 156 may also be substantially vertical, so that the upper and lower portions of the ink stick body are of substantially equal dimensions. The ink stick is illustrated without the key shapes on the lateral sides that correspond to the key plate openings through the key plate 126, to simplify the illustration. The basic ink stick body, including keying features, has a longitudinal dimension between the end surfaces 160 of approximately 0.8–2.0 inches (20–51 mm), such as 1.2 inch (30 mm). The ink stick body has a lateral dimension between the lateral extremities of between approximately 1.0 and 2.0 inches (25–51 mm), such as 1.5 inch (38 mm). The ink stick body has a vertical dimension between the top and bottom surfaces of between approximately 0.8 and 1.6 inches (20–41 mm), such as 1.3 inches (34 mm). The lateral dimension of the ink stick feed channel is approximately 0.004 to 0.2 inches (0.1–5.0 mm) wider than the lateral dimension of the ink stick body.

The ink stick has a lateral center of gravity 163 between the two lateral sides 156 of the ink stick body. In the particular embodiment illustrated, the weight distribution of the ink stick body is substantially uniform (not including protruding key elements), and the ink stick body is substantially symmetrical about its lateral center (not including protruding key elements), so that the lateral center of gravity 163 is approximately at the midpoint between the lateral sides 156 of the ink stick body (not including protruding key elements). Similarly, the ink stick body has a vertical center of gravity 164 that is substantially midway between the top surface 154 of the ink stick body and the bottom surface 152 of the ink stick body.

The ink stick includes guide means for guiding the ink stick along a feed channel 128A, 128B, 128C, 128D of the solid ink feed system. A first guide element 166 formed in the ink stick body forms one portion of the ink stick guide means. The first ink stick guide element 166 is laterally offset from the lateral center of gravity 163 of the ink stick body. In this exemplary embodiment, the first guide element 166 is adjacent one of the lateral sides of the ink stick body. In the illustrated embodiment, the first ink stick guide element 166 is formed in the ink stick body as a lower ink stick guide element 166 substantially below the vertical center of gravity 164. In this exemplary embodiment, the lower guide element 166 is adjacent one of the lateral sides of the ink stick body. In the embodiment illustrated in FIG. 12, the lower ink stick guide element is formed in the bottom surface 152 of the ink stick body, and in particular is formed as a protrusion from the bottom surface of the ink stick body. This protruding guide element is formed at or near a first lateral edge 158A of the bottom surface. The protruding guide element 166 extends along the length of the ink stick body, from the leading (front) end surface to the trailing (rear) end surface. The guide element has a lateral dimension of approximately 0.12 inches (3.0 mm) and protrudes approximately 0.08–0.2 inches (2.0–5.0 mm) from the bottom surface of the ink stick body. The protruding guide element 166 tapers from its proximal base, where it joins the main ink stick body, to its distal tip. The distal tip may be somewhat rounded. The guide element encompasses no more than approximately 30% of the width of the bottom portion of the feed stick, and particularly is approximately 15% of the width of the bottom surface 152 of the ink stick.

Figure 13:
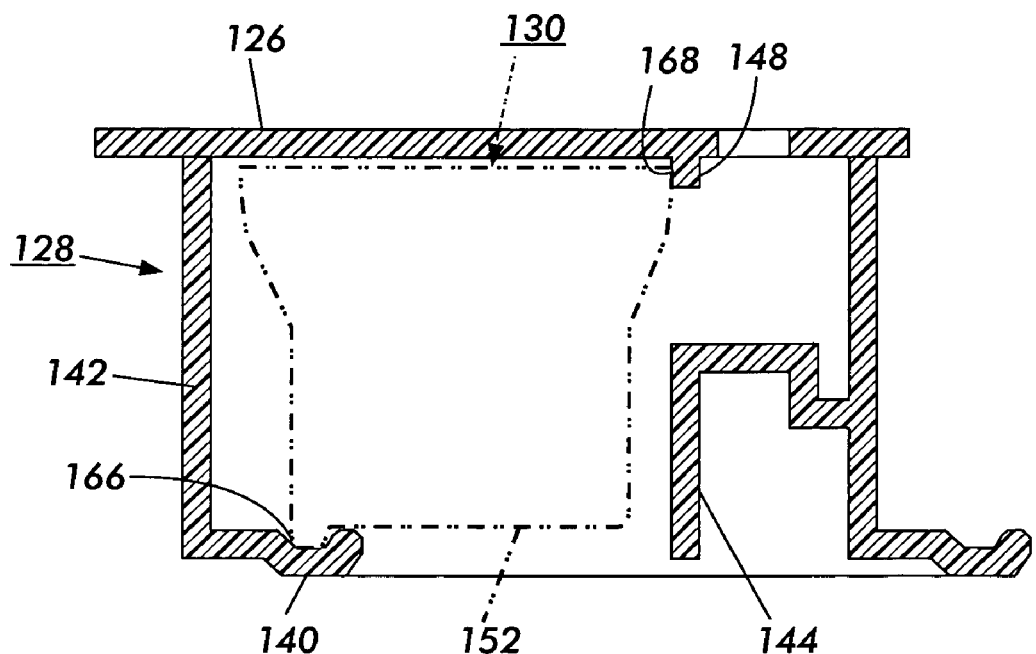
FIG. 13 is a simplified cross-sectional view of a feed channel taken along line 13—13 of FIG. 10.

FIG. 13 shows a cross sectional view of a particular embodiment of the longitudinal feed channel 128 of the solid ink feed system. The feed channel includes a feed channel guide rail 140 positioned in a lower portion of the feed channel. This feed channel guide rail 140 provides feed system guide means for guiding the ink stick 130 in the feed channel. The first ink stick guide element 166 interacts with a first portion of the feed channel, and in particular the feed channel guide rail 140, to guide the ink stick along the feed channel 128. The feed channel guide rail 140 of the solid ink feed system and the first guide element 166 formed in the ink stick body have compatible or complementary shapes. The complementary shapes allow the lower guide element 166 of the ink stick body to slidingly engage the feed channel guide rail 140 of the ink stick feed channel 128.

The width of the feed channel guide rail 140 is substantially less than the width of the feed channel. A majority of the bottom of the feed channel is recessed or open, so that it does not contact the bottom surface 152 of the ink stick 130. The recessed or open bottom of the feed channel allows flakes or chips of the ink stick material to fall away, so that such flakes or chips do not interfere with the sliding movement of the ink stick along the feed channel. The guide rail encompasses less than 30%, and particularly 5%–25%, and more particularly approximately 15% of the width of the feed channel.

The feed channel guide rail 140 is suspended from a first side wall 142 of the feed channel. A second side wall 144 is on the opposite side of the feed channel. The side walls 142, 144 need not be solid, as the side surfaces 156 of the ink stick do not slide along them. Partial side walls may be advantageous in reducing the weight of the ink feed system. Certain environments can suggest having the guide rail 140 supported by a structure rising from the bottom of the ink feed system, rather than suspended from the side wall.

The weight of the ink stick body provides a vertical force to the interaction between the ink stick body guide element 166 and the feed channel guide rail 140 of the ink stick feed system. With the guide element of the ink stick body significantly offset laterally from the lateral center of gravity of the ink stick body, the ink stick body in the feed channel tends to rotate about a pivot point formed by the engagement of the ink stick guide element with the feed channel guide rail. The feed channel guide rail provides sufficient lateral resistance to movement of the ink stick guide element 166 that the ink stick guide element 166 remains in the feed channel guide rail 140.

The ink stick body additionally includes a second ink stick guide element 168 that guides another portion of the ink stick body along another portion of the feed channel, such as a second, upper guide rail 148 in the feed channel. The upper ink stick guide element 168 forms an additional portion of the ink stick guide means. The second ink stick guide element 168 is formed on the opposite side of the lateral center of gravity 163 from the first ink stick guide element 166. In the illustrated embodiment, the second ink stick guide element is formed in the ink stick body above the vertical center of gravity 164 of the ink stick body. Further, the second ink stick upper guide element is formed of a portion of the lateral side surface 156 of the ink stick body. For example, the second ink stick guide element is that upper portion of the lateral side surface adjacent the intersection of the lateral side surface 156 with the top surface 154 of the ink stick body. If at least the upper portions of the side surfaces 156 of the ink stick body are substantially vertical, the intersection of the lateral side surface with the top surface forms substantially a right angle. Alternatively, the lateral side surfaces (or at least at the upper portions thereof) may be angled or segmented to provide a protruding portion of the lateral side wall as the upper guide element. In either case, the lateral side surface containing the upper guide element also intersects the bottom surface 152 of the ink stick body on the lateral edge 158B of the bottom surface opposite the lateral edge nearest the lower guide element 166. Thus, the upper edge forming the upper guide element 168 corresponds to the bottom surface lateral edge 158B opposite the lateral edge 158A nearest the lower guide element 166.

As seen FIG. 13, the upper ink stick guide element 168 slidingly engages the upper feed channel guide rail 148 of the solid ink feed system. The upper feed channel guide rail can be formed as part of the key plate 126 that covers the feed channel, or as a part of the feed channel body. The upper feed channel guide rail 148 is positioned so that the upper ink stick guide element 168 exerts a slight lateral force on the upper guide rail. This lateral force tends to minimize the engagement force between the upper ink stick guide element and the upper feed channel guide rail. Those skilled in the art will recognize that the upper ink stick guide element can take on other forms than these specific shapes illustrated.

The longitudinal ink stick guide element 166 in the bottom surface of the ink stick body and the feed channel guide rail 140 cooperate to maintain the orientation of the ink stick as the ink stick progresses along the length of the feed channel from the feed end to the melt end. The ink stick guide element 166 and the feed channel guide rail 140 forming the guide means keep the ink stick aligned with the feed channel. The ink stick body does not become skewed with respect to the feed channel. With the ink stick properly aligned with the feed channel, the ink stick meets the melt plate 32 normal to the melt plate surface. Proper alignment between the ink stick and the melt plate enhances even melting of the ink stick. Even melting reduces the formation of unmelted corner slivers at the trailing end of each ink stick. Such unmelted corner slivers may slip through the gap 33 between the melt plate and the end of the feed channel. Such slivers may interfere with the proper functioning of certain portions of the printer.

The ink stick is guided along the feed channel 128 with only two lines of contact (or points of contact if discontinuous ink stick guide elements are used) between the ink stick body and the feed channel—the lower ink stick guide element 166 contacting the lower feed channel guide rail 140, and the upper ink stick guide element contacting the upper feed channel guide rail 148. This arrangement provides greater accuracy in guiding the ink stick along the feed channel, so that the ink stick retains its orientation in the feed channel as the ink stick progresses toward the melt plate 32.

In certain implementations of the ink stick, the lower guide element 166 is formed slightly spaced from the lateral edge 158A of the ink stick body. This spacing reduces the stress on the guide element that might tend to cause portions of the guide element or adjacent portions of the ink stick body to break off.

Key element shapes in the lateral side surfaces 156 of the ink stick body may tend to affect the orientation of the ink stick body as the ink stick moves along the feed channel. The interaction of the guide element 166 and the guide rail 140 counteracts that tendency, and maintains the correct orientation of the ink stick in the feed channel. The cooperative action of the ink stick guide element 166 and the feed channel guide rail 140 also reduce the "steering" effect the push block 34 acting on the trailing end surface of the ink stick in the feed channel 128. Thus, laterally offset pressure by the ink block is of lesser concern, and maintaining a perfect lateral balance of the force exerted by the push block on the ink stick is less critical than with certain other designs.

Figure 14:
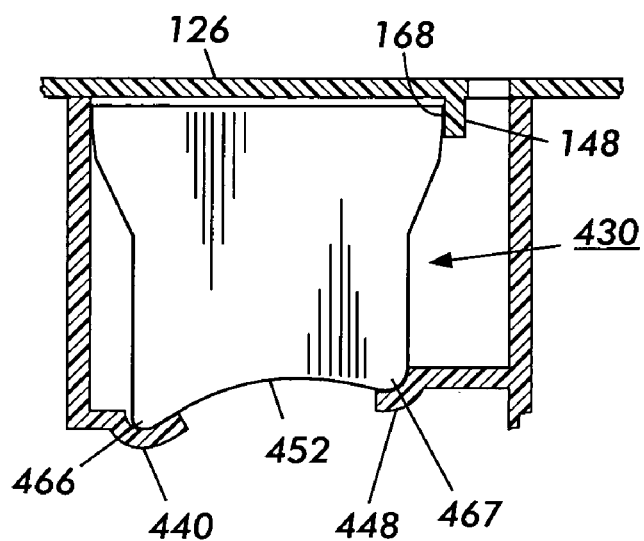
FIG. 14 is a simplified cross-sectional view of another embodiment of a feed channel, with another embodiment of a solid ink stick.

FIGS. 14 through 22 show ink sticks having alternative shapes for the ink stick guide element. As seen in FIG. 14, the bottom surface of the ink stick body can be neither horizontal nor flat.

FIG. 14 illustrates an ink stick 430 in which the bottom surface of the ink stick body is curved, rather than flat. With the particular shape to the bottom surface 452 shown in FIG. 14, a second guide element 467 can be formed in the bottom surface of the ink stick body, on the side opposite from the first lower guide element 466. This second lower guide element can be in lieu of, or in addition to, the upper guide element 168 formed in the upper portion of the ink stick body. An ink stick feed channel for receiving an ink stick with such second lower guide element 467 has a second guide rail 448 in the lower portion of the feed channel for slidingly engaging the second lower guide element. This second lower guide rail 448 is substantially similar to the first lower guide rail 440. Although the illustration of FIG. 14 includes both a second lower ink stick guide element 467 interacting with a second lower feed channel guide rail 448 and an upper ink stick guide element 168 interacting with an upper feed channel guide rail 148, in most uses only one of those interactions is needed to guide the ink stick along the feed channel. The ink stick of FIG. 14 need not use the second lower guide element 467, using only the upper guide element 168 to balance the interaction between the lower guide element 466 and the feed channel guide rail 440. In such an implementation, the only contact between the lower portion of the ink stick and the feed channel is the contact between the lower guide element 466 and the single feed channel guide rail 440 in the feed channel. In an alternative, the two lower ink stick guide elements 466, 467 each interact with the lower feed channel guide rails 440, 448, and the upper guide rail 148 is eliminated.

Figure 15:
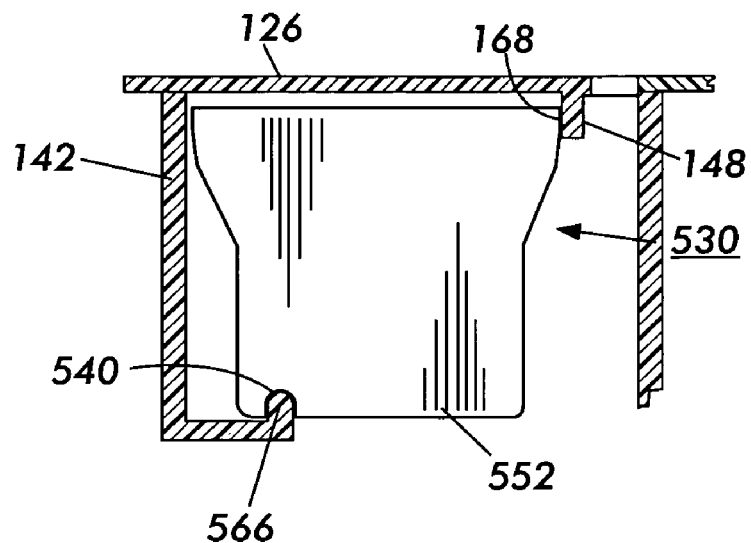
FIG. 15 is a simplified cross-sectional view of another embodiment of a feed channel, with another embodiment of a solid ink stick.

FIG. 15 shows an ink stick embodiment 530 in which the laterally offset lower ink stick guide element 566 is recessed into the bottom surface 552 of the ink stick body. The feed channel guide rail 540 in the feed channel for such an ink stick is raised, with a shape complementary to the shape of the recessed ink stick guide element 466, to slidingly engage the recessed ink stick guide element. A second feed channel guide rail 148 engages a different portion of the ink stick body to balance the ink stick in the feed channel.

Figure 16:
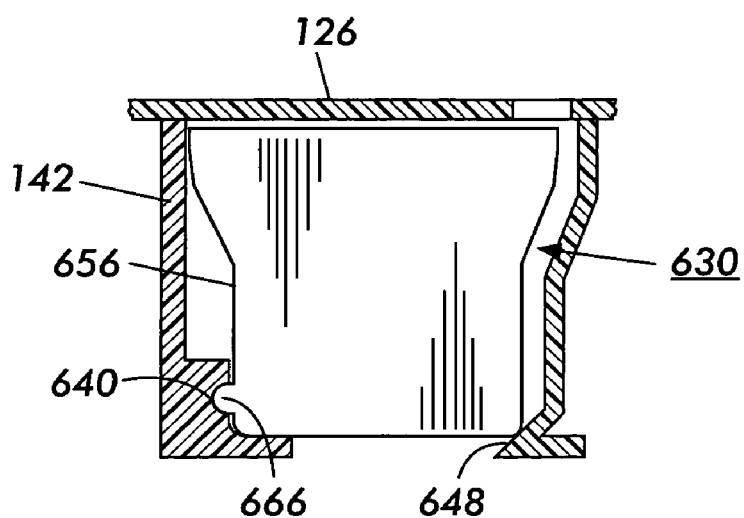
FIG. 16 is a simplified cross-sectional view of another embodiment of a feed channel, with another embodiment of a solid ink stick.
Figure 17:
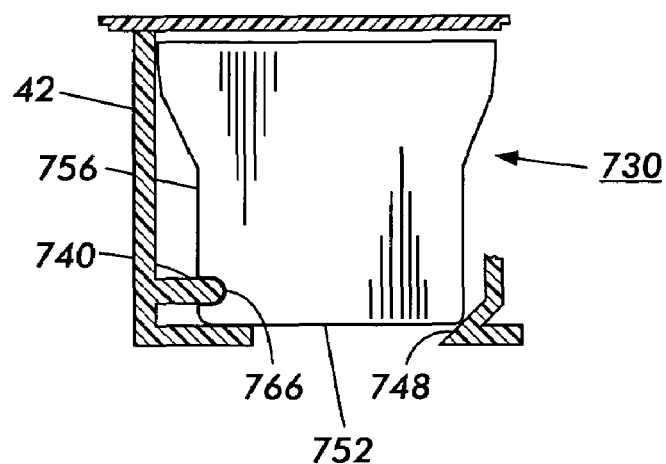
FIG. 17 is a simplified cross-sectional view of another embodiment of a feed channel, with another embodiment of a solid ink stick.

FIGS. 16 and 17 show embodiments of the ink stick 630, 730 (respectively) in which the lower ink stick guide element 666, 766 is formed on a lateral side surface of the ink stick body. The ink stick guide element is formed in the ink stick body below the vertical center of gravity. The side surface of the feed channel of the ink stick feed system for such an ink stick is correspondingly formed with a complementary feed channel guide rail 640, 740 to engage such an ink stick guide element formed on the side surface of the ink stick body. The ink stick embodiment illustrated in FIG. 16 includes a protruding ink stick guide element 666 from the side surface 656 of the ink stick body. The ink stick body tends to pivot about the line at which the ink stick guide element 666 and the feed channel guide rail 640 interact. Therefore, the feed channel guide rail 640 provides sufficient vertical resistance to the ink stick guide element to hold the ink stick in place. A second feed channel guide rail 648 in this embodiment not only helps to guide the ink stick as it moves along the feed channel, but also helps to hold the ink stick guide element 666 in the first feed channel guide rail 640. To do that, the second feed channel guide rail is provides resistance in both the vertical and horizontal dimensions to movement of the second side of the ink stick body. The illustrated second feed channel guide rail 648 includes an angled element that interacts with the lower edge of the ink stick body. However, other configurations can also be used. For example, the second feed channel guide rail can have separate elements, one of which is substantially aligned with the bottom surface of the ink stick, and another of which is substantially aligned with the second side surface of the ink stick body. Some feed channel and ink stick configurations may benefit from an additional vertical support for the ink stick, in the form of an additional portion of feed channel frame supporting a portion of the bottom surface of the ink stick body.

FIG. 17 illustrates an embodiment of the ink stick in which the lower ink stick guide element 766 is recessed into the side surface 756 of the ink stick body. The side of the feed channel includes a correspondingly shaped feed channel guide rail 740. In this embodiment also, a second feed channel guide rail 748 provides resistance in both the vertical and horizontal dimensions to movement of the second side of the ink stick body. The illustrated second feed channel guide rail includes an angled element that interacts with the lower edge of the ink stick body. However, other configurations can also be used.

Figure 18:
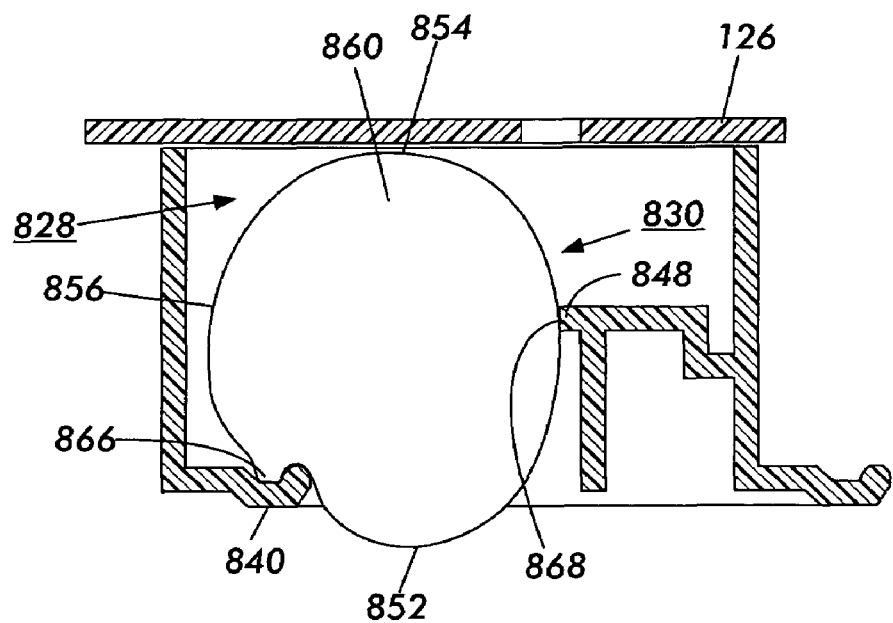
FIG. 18 is a simplified cross-sectional view of another embodiment of a feed channel, with another embodiment of a solid ink stick.
Figure 19:
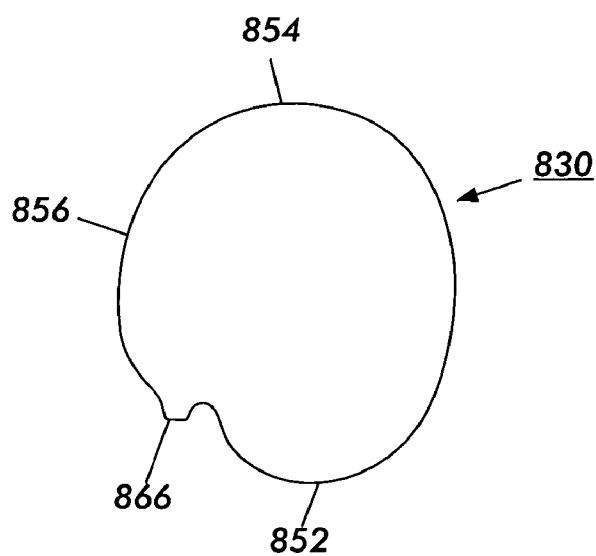
FIG. 19 is an end elevational view of the solid ink stick shown in FIG. 18.

FIGS. 18 and 19 illustrate an embodiment of the ink stick 830 in which the surfaces of the ink stick body are curved, and a feed channel for receiving such an ink stick. A first ink stick guide element 866 is formed in portion of the outer surface of the ink stick body, laterally offset from the lateral center of gravity of the ink stick body. The illustrated embodiment does not include edges at which flat surfaces meet. The curved bottom 852 of the ink stick body transitions into the curved sides 856, and the sides transition into the top 854. The ink stick body includes sufficient linear length to provide the first ink stick guide element 866 sufficient length between the ends 860 of the ink stick body to properly guide the ink stick along the feed channel guide rail 140. The feed channel has a second feed channel guide rail 848 positioned to slidingly engage a second ink stick guide element 868. The second ink stick guide element 868 is that portion of the exterior of the ink stick body, such as a section of the side of the ink stick body, that contacts the second feed channel guide rail 868 in response to the tendency of the ink stick body to rotate about the line of interaction between the first ink stick guide element 866 and the first feed channel guide rail 840. Of course, the ink stick can also incorporate a combination of flat surfaces and curved surfaces, so that a wide variety of ink stick shapes are compatible with the present invention.

Figure 20:
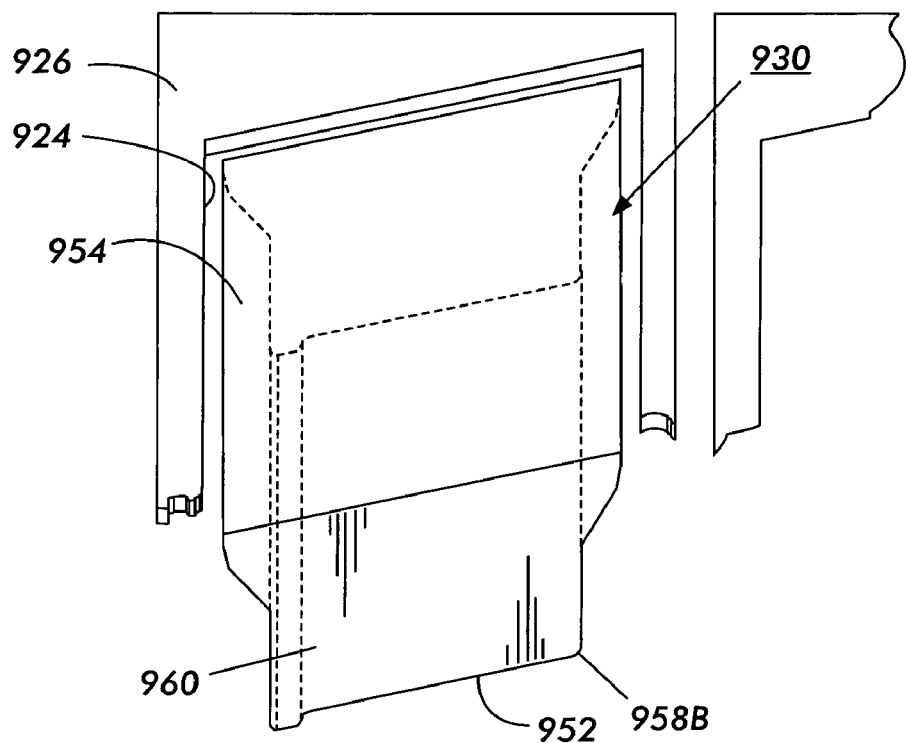
FIG. 20 is a perspective view of yet another embodiment of a solid ink stick.

FIG. 20 shows an embodiment of the ink stick 930 in which the end surfaces 960 of the ink stick body are substantially flat, but not perpendicular to the lateral side surfaces 956. Thus, the bottom and top surfaces 952, 954 of the ink stick are not rectangular. The ink stick is illustrated as it is inserted through a correspondingly shaped key plate opening 924 in a printer key plate 926.

Figure 21:
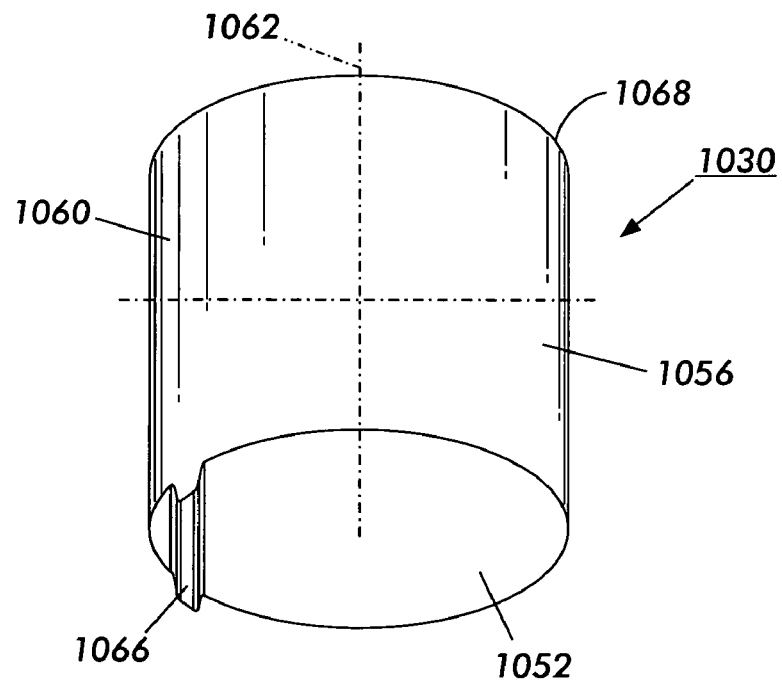
FIG. 21 is a perspective view of yet another embodiment of a solid ink stick.

FIG. 21 shows an embodiment of the ink stick 1030 in which the ink stick has a substantially cylindrical shape. This embodiment illustrates that the ends 1060 of the ink stick body and the sides 1056 do not need to meet at a corner of the ink stick body. The first ink stick guide element 1066, laterally offset from the lateral center of gravity 1062 of the primary portion of the ink stick body, extends linearly along a segment of the bottom 1052 of the ink stick body sufficient to permit the ink stick guide element 1066 to properly guide the ink stick along a feed channel guide rail in the feed channel (not shown). A portion of the outer surface of the side 1056 on the opposite side of the lateral center of gravity forms a second ink stick guide element 1068. The second ink stick guide element slidingly engages a second feed channel guide rail (not shown) in the ink feed channel of the printer.

Figure 22:
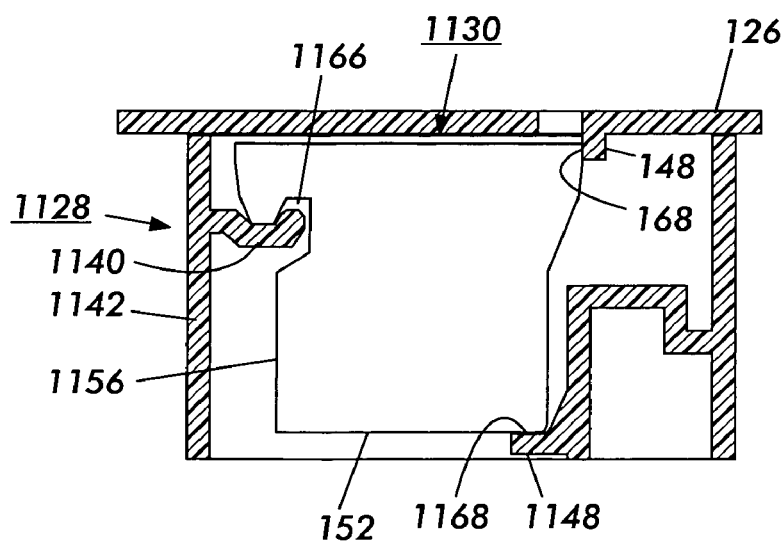
FIG. 22 is a simplified cross-sectional view of another embodiment of a feed channel, with another embodiment of a solid ink stick.

FIG. 22 shows yet another embodiment of the ink stick 1130, and corresponding feed channel 1128, to illustrate some of the numerous configurations possible. The ink stick 1130 of FIG. 22 has a first ink stick guide element 1166 formed as a protrusion from the upper portion of a lateral side surface 1156 of the ink stick body. The protruding ink stick guide element 1166 rests on and slidingly engages a first feed channel guide rail 1140 that extends from the side wall 1142 of the feed channel. In the particular embodiment illustrated, the side of the ink stick body has an indentation just below the ink stick guide element 1166, to accommodate the end of the feed channel guide rail 1140. However, such an indentation is not necessary in all instances. The ink stick body tends to rotate about the line of contact or interaction between the ink stick guide element 1166 and the first ink channel guide rail 1140, so the feed channel includes a second feed channel guide rail 1148, which interacts with a second ink stick guide element 1168. The second ink stick guide element 1168 slidingly engages the second feed channel guide rail 1148. The second ink stick guide element 1168 is shown at the bottom of the ink stick body. An upper ink stick guide element 1168 engaging an upper feed channel guide rail 1148 can be used in addition to the second ink stick guide element 1168, or in some cases, in lieu of the second ink stick guide element 1168.

Those skilled in the art will recognize that, with the protruding type of guide element such as shown in several of the illustrated embodiments, the protrusion need not necessarily extend along the entire length of the ink stick body from the leading end surface to the trailing end surface. The protruding guide element may be formed in one or more segments, each of which extends along only a portion of the length of the ink stick body. However, a guide element formed along the entire length of the ink stick body, or at least segments formed at or near the leading (front) end surface, and at or near the trailing (rear) end surface of the ink stick body provide improved leverage for maintaining the proper orientation of the ink stick in the feed channel of the solid ink feed system.

Figure 3:
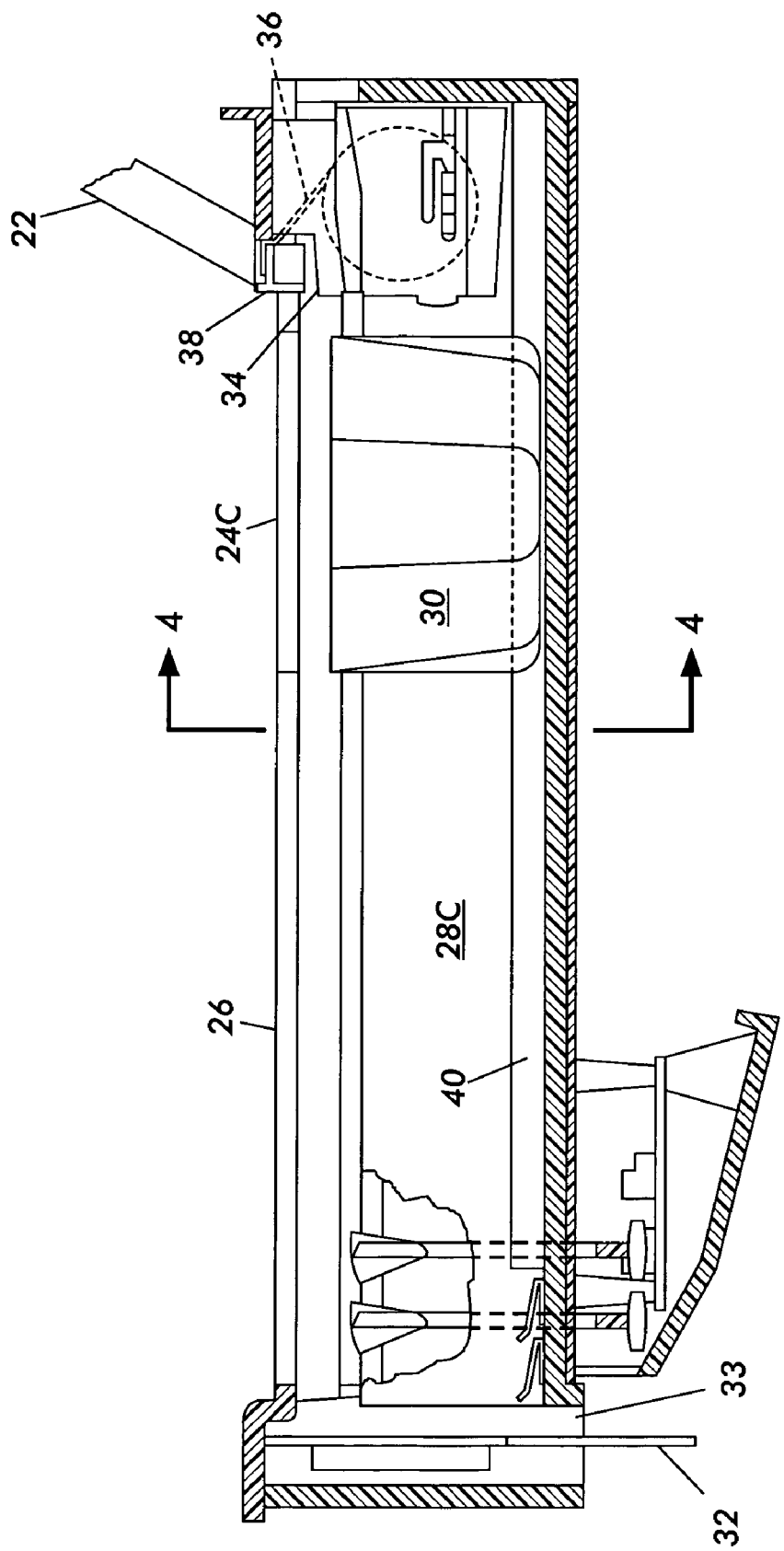
FIG. 3 is a side sectional view of a feed channel of a solid ink feed system taken along line 3—3 of FIG. 2.

A method of loading an ink stick into a solid ink feed system includes inserting the ink stick through the appropriately shaped keyed opening 24 or 124, and into the insertion end of the longitudinal feed channel, as seen in FIGS. 2, 3, and 10. The first, lower ink stick guide element 66, 166 is aligned with the feed channel guide rail 40, 140 in the ink stick feed channel (see FIGS. 4 and 13). The ink stick is placed in the channel with the ink stick guide element 66, 166 on the feed channel guide rail 40, 140 so that the contact between the ink stick guide element and the feed channel guide rail is substantially the only contact between the bottom surface of the ink stick and the feed system. With the embodiment shown in FIGS. 9–13, when the ink stick body is released into the feed channel, the gravitational forces cause the upper ink stick guide element 168 of the ink stick body to engage the upper feed channel guide rail 148. In accordance with known techniques, the push block 34 in the feed channel pushes the ink stick along the length of the feed channel. For ink sticks similar to the embodiments illustrated in FIGS. 16 and 17, upon inserting the ink sticks into the insertion end of the feed channel, the user additionally longitudinally aligns the ink stick guide element 666, 766 with the corresponding feed channel guide rail 640, 740.

Those skilled in the art will recognize that corners and edges may have radii or other non-sharp configurations, depending on various factors, including manufacturing considerations. Numerous modifications can be made to the specific implementations described above. Those skilled in the art will recognize that the guide element in the bottom surface of the ink stick body, and the guide rail in the bottom of the feed channel may have numerous shapes other than the particular shapes illustrated. In addition, numerous other configurations of the feed channel, key plate, and other components of the ink feed system can be constructed within the scope of the invention. Therefore, the following claims are not to be limited to the specific embodiments illustrated and described above.

What is claimed is:

1. An ink stick for use in a solid ink feed system of a phase change ink printer, wherein the solid ink feed system includes a shaped guide rail, the ink stick comprising:
   a three dimensional ink stick body having a guide surface and a plurality of side surfaces that intersect the guide surface; and
   a shaped guide element formed in the guide surface of the ink stick body;
   wherein at least one of the side surfaces has a predetermined non-planar key shape so that the ink stick can be inserted in an insertion direction into the solid ink feed system through an opening having a corresponding non-planar key shape;
   wherein the shaped guide element is shaped for guiding the ink stick in a feed direction along a defined path in the ink stick feed system;
   wherein the feed direction is substantially perpendicular to the insertion direction; and
   wherein the shaped guide element has a shape that complements the shape of the shaped guide rail in the solid ink feed system.

2. The ink stick of claim 1, wherein the side surfaces are oriented in planes that are substantially different from the plane of the guide surface.

3. The ink stick of claim 1, wherein each of the side surfaces has a plane that is substantially different from the plane of the guide surface.

4. An ink stick for use in a solid ink feed system of a phase change ink printer, wherein the solid ink feed system includes an elongate shaped guide rail extending in a feed direction, the ink stick comprising:
   a three dimensional ink stick body having an insertion perimeter;
   a shaped guide element formed in the ink stick body;
   wherein the shaped guide element is shaped to interact with the elongate shaped guide rail of the solid ink feed system for guiding the ink stick in the feed direction along the guide rail;
   wherein the ink stick insertion perimeter is in a plane substantially perpendicular to an insertion direction;
   wherein the insertion perimeter has a perimeter shape corresponding to the shape of an insertion opening through a key plate covering at least a portion of the elongate shaped guide rail; and
   wherein the insertion direction is substantially different from the feed direction.

5. The ink stick of claim 4, wherein the shaped guide element is non-planar.

6. The ink stick of claim 5, wherein the ink stick shaped guide element has a shape substantially matching the shape of the elongate shaped guide rail of the solid ink feed system.

7. The ink stick of claim 4, wherein the ink stick has a dimension in the insertion dimension less than a distance between the elongate shaped guide rail and the plate.

8. The ink stick of claim 4, wherein the ink stick insertion perimeter is such that no more than one ink stick having the ink stick insertion perimeter simultaneously fits through the insertion opening.

9. The ink stick of claim 8, wherein the ink stick insertion perimeter substantially fills the insertion opening through the plate.

10. The ink stick of claim 4, wherein the shaped guide element is not formed in the insertion perimeter of the ink stick body.

11. A method of inserting an solid ink stick into a feed channel of a solid ink printer, the method comprising:
- providing an ink stick having an ink stick insertion perimeter; aligning the ink stick insertion perimeter with an insertion opening of a key plate;
- inserting the ink stick in an insertion direction through the insertion opening;
- aligning a shaped guide element on the ink stick with a guide rail in the feed channel;
- moving the ink stick in a feed direction in the feed channel, wherein the feed direction is different from the insertion direction;
- wherein aligning the inks stick insertion perimeter with the insertion opening comprises aligning at least three non-linear key element shapes; and
- wherein at least one of the non-linear key element shapes is oriented at least partially transverse to the feed direction.

12. The method of claim 11, wherein the insertion direction is substantially perpendicular to a plane containing the ink stick insertion perimeter.

13. The method of claim 11, wherein at least one of the non-linear key element shapes is oriented substantially parallel to the feed direction.

14. A solid ink feed system for a phase change ink jet printer, the feed system comprising:
- a longitudinal feed channel;
- a first longitudinal guide rail extending along a length of the feed channel in a feed direction; and
- a key plate having an insertion opening with an insertion opening shape through it to admit an ink stick in an insertion direction completely through the key plate into the longitudinal feed channel;
- an ink stick having a longitudinal guide element and having an ink stick insertion perimeter shape substantially similar to the insertion opening shape;

wherein:
- the feed direction is different from the insertion direction; and
- the shape of the ink stick guide element and the shape of the feed channel guide rail substantially complement one another, so that when the ink stick is placed in the feed channel, the feed channel guide rail and the ink stick guide element interact to guide the ink stick along the feed channel.

15. The solid ink feed system of claim 14, wherein the width of the longitudinal guide rail is substantially less than the width of the feed channel.

16. The solid ink feed system of claim 14, wherein:
- the guide rail includes a protrusion; and
- the ink stick guide element is a recess into the guide surface of the ink stick.

17. The solid ink feed system of claim 14, wherein:
- the guide rail includes a recess; and
- the ink stick guide element is a protrusion on the guide surface of the ink stick.

18. The solid ink feed system of claim 14, wherein the ink stick has an insertion perimeter shape that is substantially the same as the shape of the insertion opening in the key plate.

19. The solid ink feed system of claim 14, wherein the feed direction is substantially perpendicular to the insertion direction.

20. The solid ink feed system of claim 14, wherein the ink stick insertion perimeter is almost the same size as the insertion opening.

* * * * *